US012701105B2

(12) United States Patent
Nadir et al.

(10) Patent No.: US 12,701,105 B2
(45) Date of Patent: Aug. 4, 2026

(54) SYSTEM AND METHOD FOR ANALYZING REAL-TIME DATA FROM HETEROGENEOUS COLLABORATION PLATFORMS TO IDENTIFY RISK

(71) Applicant: THETA LAKE, INC., Santa Barbara, CA (US)

(72) Inventors: Daniel Oshiro Nadir, Carlsbad, CA (US); Devin H. Redmond, Encinitas, CA (US); Richard B. Sutton, San Mateo, CA (US); Derek Gordon Brenner, Lompoc, CA (US); Gary Philip Pinkham, Reading, MA (US)

(73) Assignee: THETA LAKE, INC., Santa Barbara, CA (US)

( * ) Notice: Subject to any disclaimer, the term of this patent is extended or adjusted under 35 U.S.C. 154(b) by 136 days.

(21) Appl. No.: 17/741,528

(22) Filed: May 11, 2022

(65) Prior Publication Data

US 2023/0370434 A1 Nov. 16, 2023

(51) Int. Cl.
| | |
|---|---|
| *H04L 9/40* | (2022.01) |
| *H04L 51/04* | (2022.01) |
| *H04L 65/1083* | (2022.01) |
| *H04L 65/403* | (2022.01) |

(52) U.S. Cl.
CPC .......... *H04L 63/0428* (2013.01); *H04L 51/04* (2013.01); *H04L 63/166* (2013.01); *H04L 65/1083* (2013.01); *H04L 65/403* (2013.01)

(58) Field of Classification Search
CPC ... H04L 63/0428; H04L 63/166; H04L 51/04; H04L 65/1083; H04L 65/403

USPC .......................................................... 726/26
See application file for complete search history.

(56) References Cited

U.S. PATENT DOCUMENTS

| | | | |
|---|---|---|---|
| 8,234,688 B2 | 7/2012 | Grandison | |
| 9,503,482 B1 | 11/2016 | Hugenbruch | |
| 10,038,785 B1 | 7/2018 | Wu et al. | |
| 10,474,416 B1 | 11/2019 | Farivar et al. | |
| 10,810,361 B1 * | 10/2020 | Venkatraman | H04L 63/0421 |
| 10,956,831 B2 * | 3/2021 | Bellamy | G06N 20/00 |
| 11,310,283 B1 * | 4/2022 | Hatch | H04L 63/205 |
| 11,438,233 B1 * | 9/2022 | Nadir | H04L 41/0894 |
| 11,792,076 B2 * | 10/2023 | Nadir | H04L 41/0894 |
| | | | 709/224 |

(Continued)

FOREIGN PATENT DOCUMENTS

| | | | | |
|---|---|---|---|---|
| CN | 114389955 A | * | 4/2022 | H04L 41/0659 |

OTHER PUBLICATIONS

FOA issued in U.S. Appl. No. 17/883,221, mailed Sep. 26, 2023, 17 pages.

(Continued)

*Primary Examiner* — Tauqir Hussain
(74) *Attorney, Agent, or Firm* — Sprinkle IP Law Group

(57) ABSTRACT

A data security system uses API connections to heterogeneous collaboration platforms to analyze elements of conversations to identify regulatory, security, and privacy risks and take corresponding actions to limit and remediate risks in real-time. In some embodiments, the data security system can use API event triggers to determine when an action is taken, apply a machine learning-based detections to identify relevant risks, and take a corresponding remedial action such as removing a user from a conversation.

20 Claims, 5 Drawing Sheets

(56) References Cited

U.S. PATENT DOCUMENTS

| | | | |
|---|---|---|---|
| 11,816,311 B2* | 11/2023 | Ostrand | H04L 67/535 |
| 12,073,851 B2 | 8/2024 | Reece | |
| 12,096,152 B2 | 9/2024 | Baughman | |
| 12,464,032 B2 | 11/2025 | Hüffner et al. | |
| 2003/0182422 A1* | 9/2003 | Bradshaw | G06F 16/122 |
| | | | 709/225 |
| 2011/0296003 A1 | 12/2011 | McCann | |
| 2014/0278405 A1* | 9/2014 | Peters | G10L 15/1822 |
| | | | 704/235 |
| 2015/0181020 A1 | 6/2015 | Fitzsimmons | |
| 2016/0212238 A1 | 7/2016 | Lacas et al. | |
| 2017/0034581 A1* | 2/2017 | Short | H04N 21/47214 |
| 2017/0206417 A1 | 7/2017 | Aoyama et al. | |
| 2017/0249234 A1* | 8/2017 | Kalech | G06F 11/0793 |
| 2019/0189117 A1 | 6/2019 | Kumar | |
| 2019/0190878 A1 | 6/2019 | Li et al. | |
| 2020/0028879 A1 | 1/2020 | Lahiri et al. | |
| 2020/0036989 A1 | 1/2020 | Heindel | |
| 2020/0241949 A1* | 7/2020 | Basu | G06F 11/0775 |
| 2020/0312348 A1 | 10/2020 | Sjaop | |
| 2021/0158946 A1 | 5/2021 | Starobinets | |
| 2021/0399911 A1* | 12/2021 | Jorasch | H04L 12/1822 |
| 2021/0400142 A1* | 12/2021 | Jorasch | H04L 65/1069 |
| 2022/0046059 A1 | 2/2022 | Pandurangi | |
| 2022/0086393 A1* | 3/2022 | Peters | G06V 20/41 |
| 2022/0121776 A1* | 4/2022 | Johnston | G06F 21/554 |
| 2022/0271962 A1* | 8/2022 | Patel | G06F 3/167 |
| 2022/0272134 A1* | 8/2022 | Jain | H04L 65/4015 |
| 2022/0303321 A1* | 9/2022 | Ostrand | H04L 65/4015 |
| 2022/0337537 A1 | 10/2022 | Lewis et al. | |
| 2022/0414241 A1 | 12/2022 | Chittampally et al. | |
| 2022/0415316 A1* | 12/2022 | Shaikh | G06Q 10/101 |
| 2023/0022374 A1 | 1/2023 | Nadir | |
| 2023/0025718 A1 | 1/2023 | Varnavas et al. | |
| 2023/0069524 A1* | 3/2023 | Hüffner | G06F 21/50 |
| 2024/0007351 A1 | 1/2024 | Nadir et al. | |
| 2024/0219255 A1 | 7/2024 | Aseev et al. | |
| 2025/0087020 A1 | 3/2025 | Chyn et al. | |

OTHER PUBLICATIONS

Office Action issued in U.S. Appl. No. 17/862,448 mailed Nov. 10, 2022, 10 pgs.

Office Action issued by the U.S. Patent and Trademark Office (USPTO) for U.S. Appl. No. 17/883,221, mailed Feb. 15, 2024, 15 pages.

Office Action issued by the U.S. Patent and Trademark Office (USPTO) for U.S. Appl. No. 18/468,836, mailed Apr. 18, 2024, 22 pages.

Notice of Allowance issued in U.S. Appl. No. 17/862,448 mailed Feb. 23, 2023, 9 pages.

Notice of Allowance issued by the U.S. Patent and Trademark Office for U.S. Appl. No. 18/468,836, mailed Aug. 13, 2024, 10 pages.

Office Action issued by the U.S. Patent and Trademark Office (USPTO) for U.S. Appl. No. 17/883,221, mailed Oct. 4, 2024, 17 pages.

Notice of Allowance issued by the U.S. Patent and Trademark Office for U.S. Appl. No. 18/468,836, mailed Dec. 12, 2024, 7 pages.

Notice of Allowance issued by the U.S. Patent and Trademark Office (USPTO) for U.S. Appl. No. 17/883,221, mailed Mar. 26, 2025, 11 pages.

* cited by examiner

SYSTEM AND METHOD FOR ANALYZING REAL-TIME DATA FROM HETEROGENEOUS COLLABORATION PLATFORMS TO IDENTIFY RISK

TECHNICAL FIELD

This disclosure relates generally to computer-based collaboration. More particularly, embodiments relate to systems and methods for assessing real-time risks in the use of heterogeneous collaboration platforms.

BACKGROUND

Collaboration platforms have become a dominant mode of communication for workforces, particularly in a work from anywhere business environment. Collaboration tools provide dynamic, interactive tools and capabilities including webcams, screen sharing, whiteboards, audio, chat, file transfers, etc., to facilitate more effective and meaningful communication. However, understanding how employees are using these platforms and detecting data exposure, security, and regulatory risks resulting from inadvertent or inappropriate application sharing, background images, whiteboards, and other features is extremely challenging with current technology tools. At present, the ability to detect real-time risks associated with the use of collaboration platforms is limited, and legacy supervisory processes rely on after-the-fact analysis to detect risks. Moreover, legacy supervision processes rely on manual reviews of content to identify risks, or rudimentary key word searches of transcribed video, voice, or OCR content, if available.

Previous supervision solutions provide after the fact review of primarily written or spoken content. For example, several systems can analyze emails and chat content and facilitate keyword or lexicon-based searches of such data. Other systems can record telephone conversations and apply similar word or lexicon-based searches of transcripts. Existing solutions ignore the risks of visual content (e.g., screen shares, whiteboards, webcams, etc.), and do not process information in real-time to provide contemporaneous recommendations about risk identification and remedial actions.

As such, there is a need to enhance the performance of computer-based technologies, such as data security systems, by providing the capability to assist in the real time oversight of collaboration conversations, thereby facilitating the contemporaneous enablement of controls reactive to detected risks and the enablement remedial actions including notifications regarding the sharing of risky applications in screen-shares, disabling detected inappropriate content shared over a webcam, managing settings in collaboration platforms to react to risks during sessions, removing users from meetings when sensitive documents or profanity used in file shares or screen shares, providing notifications to administrators about the settings or activities taking place during collaboration sessions, etc.

SUMMARY

The present disclosure describes techniques used in systems, methods, and computer program products that embody computerized techniques for monitoring collaboration meetings across heterogeneous online collaboration platforms, detecting certain conditions, determining the occurrence of various types of risk, and taking remedial actions in response to that determination.

In one embodiment, a data security system has a memory, a processor, and a non-transitory, computer-readable storage medium that stores a set of instructions executable by the processor for: interfacing with a plurality of heterogeneous online collaboration platforms, monitoring an active meeting conducted over a first of the collaboration platforms, the monitoring including monitoring communications and monitoring collaboration platform settings, detecting, during the active meeting, an occurrence of one or more conditions from the monitoring of the active meeting, analyzing the detected occurrence of the one or more conditions, determining, based on the analysis, that the occurrence of the one or more conditions poses a risk, and based on a determining that the occurrence of the one or more conditions poses a risk, taking one or more remedial actions.

In another embodiment, a data security method comprises: interfacing with a plurality of heterogeneous online collaboration platforms, monitoring an active meeting conducted over one of the collaboration platforms, the monitoring including monitoring communications and monitoring collaboration platform settings, detecting, during the active meeting, an occurrence of one or more conditions from the monitoring of the active meeting, analyzing the detected occurrence of the one or more conditions, determining, based on the analysis, that the occurrence of the one or more conditions poses a risk, and based on a determining that the occurrence of the one or more conditions poses a risk, taking one or more remedial actions.

In another embodiment, a data security system has a memory, a processor, and a non-transitory, computer-readable storage medium that stores a set of instructions executable by the processor for: interfacing with a plurality of heterogeneous online collaboration platforms, monitoring an active meeting conducted over a first of the collaboration platforms, the monitoring including monitoring communications and monitoring collaboration platform settings, detecting an occurrence of two or more conditions from the monitoring of the active meeting, analyzing the detected occurrence of the two or more conditions, determining, based on the analysis, that the occurrence of the one or more conditions poses a risk, and based on a determining that the occurrence of the one or more conditions poses a risk, taking one or more remedial actions.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1:
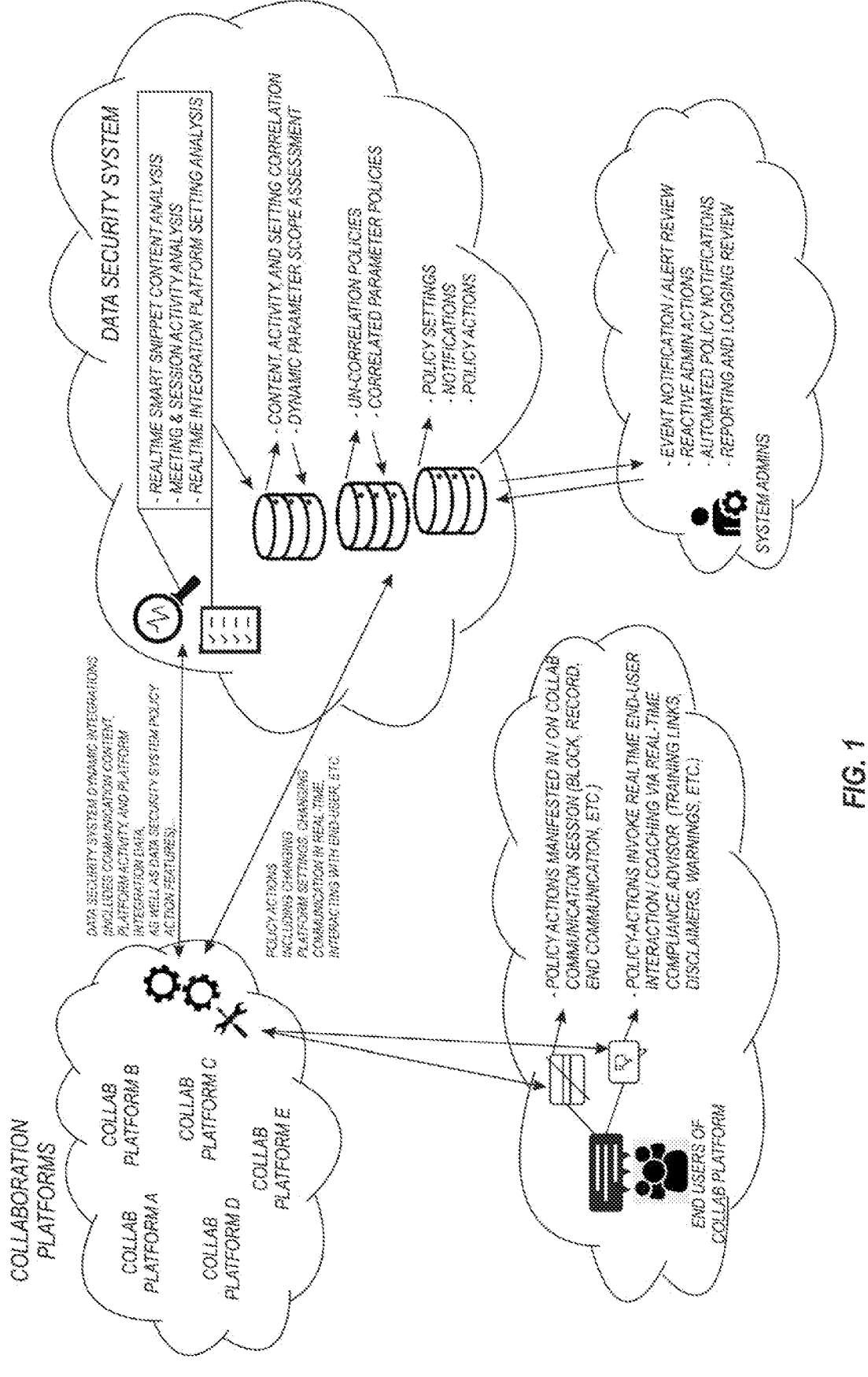
FIG. 1 is a diagram depicting the functionalities with respect to a data security system, collaboration platforms, collaboration platform end users, and data security system administrators.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in more detail, a brief description of the context in which embodiments can be utilized may be helpful. Many computing ecosystems now utilize multiple different and independently administered online collaboration platforms, involving different configurations, data formats, and collaboration settings that control access to collaborations, data shared during collaborations, and behaviors with respect to collaborations. Such collaboration settings include, for example, settings that govern who can participate in a collaboration, how a collaboration controls entry of participants, actions that users can take with respect to content of a collaboration, which applications can integrate with a collaboration or the like. The volume of heterogeneous characteristics of collaboration settings across online collaboration platforms presents challenges to the use of these platforms related to computer security, privacy, human resources (HR), conduct, acceptable use, and regulatory compliance, and in particular to enabling, monitoring and enforcement of multiple rules and settings within those platforms. Moreover, the use of specific features such as screen shares, web cams, whiteboards, chat, and audio present related real-time risks that require identification as well. Embodiments described herein provide real-time computer-based technologies to monitor and detect various conditions and settings of collaboration platforms to trigger actions or notifications for users and/or administrators of the platforms, as well as to enforce and/or adjust settings or policies of the platforms.

In some embodiments, a data security system uses API connections to collaboration platforms to analyze elements of conversations (for example, using artificial intelligence (AI)-enabled detections or other techniques) to identify regulatory, security, privacy, acceptable use, HR, and conduct risks and take corresponding actions to limit and remediate risks in real-time. Note that the concepts described herein can be applied with systems other than the examples described. The term data security system can encompass many types of systems that address security concerns or that manage meeting or collaboration risks. Collaboration platform APIs can provide triggers for certain types of actions such as screenshares or enablement of webcams and also facilitate taking actions such as removing users from conferences, changing document sensitivity classifications, blurring backgrounds, invoking a pop-up warning, displaying security training-related content, disabling the screen share, etc. A data security system can use API event triggers, among other techniques, to determine when an action is taken, apply its detections (e.g., machine learning-based detections, etc.) to identify relevant risks, and take a corresponding action such as removing a user from a conversation.

For example, during an active meeting over a collaboration platform the API may trigger a notification to the data security system that a screen share capability is being used by a participant. When the screen share API trigger is detected, the data security system can apply its machine learning-based detection to analyze the screen shared content to determine if it includes risks such as the presence of a sensitive application or sensitive personally identifiable information (PII) like a Social Security Number or birthdate. If sensitive data is detected, the data security system can take automatic, appropriate remedial actions such as manifesting a simultaneous pop-up notification to the user to exercise caution when sharing or removing the user sharing sensitive data from the meeting or other messages to facilitate employee training and awareness. Other remedial actions are also possible, as one skilled in the art would understand.

In some embodiments, real-time data from meetings can be analyzed by the data security system to determine if the meeting might present security issues such as failure to enable passwords or waiting rooms. If encountered, the data security system could end the meeting or update the security settings to align with desired requirements. Embodiments relating to the enforcement of security and compliance controls for electronic data and communications across heterogeneous collaboration platforms may be better understood with reference to commonly-owned U.S. patent application Ser. No. 17/378,481, entitled "SYSTEMS AND METHODS FOR MONITORING AND ENFORCING COLLABORATION CONTROLS ACROSS HETEROGENEOUS COLLABORATION PLATFORMS" by Nadir et al., filed on Jul. 16, 2021, which is incorporated herein by reference in its entirety for all purposes.

In some embodiments, the data security system can use real-time transcription data from a videoconferencing platform, analyze it using the system's AI detections, and take corresponding action. For example, the system's AI-based analysis may detect that a participant in a video collaboration session discussed that they are going to share a "top secret" or sensitive document. Upon detecting the shared sensitive document, the data security system may trigger a range of actions including initiating reactive administrative actions, configuring and enabling parameters for automated policy notifications, conducting reporting and logging reviews, or any other appropriate action.

The real-time capabilities discussed in this disclosure many comprise many other features. Other visually-based collaboration platform actions such as the use of whiteboards or the activation of the webcam can be analyzed with the data security system's AI-based detections could trigger pop-up notifications, changing document sensitivity labels, and removing of users from conversations, among other actions. As described above, the data security system may also use other real-time data shared during a video-based collaboration session to triangulate risks during the meeting. For example, the data security system may examine real-time chat transcripts for risky discussions as well as discussions about issues or files transferred during a meeting. In some examples, risks can be detected (for example, within a conversation) by monitoring a sequence of events. For example, particular sequences of events could trigger a "risky behavior" (e.g., a participant pausing a recording, then sharing an application, then restarting the recording, etc.) Embodiments utilizing visual-based detections to identify information may be better understood with reference to commonly-owned U.S. Provisional Patent Application No. 63/237,335, entitled "SYSTEM AND METHOD FOR VISUAL IDENTIFICATION OF DISPLAYED APPLICATIONS IN ELECTRONIC COMMUNICATIONS" by Hüffner et al., filed on Aug. 26, 2021, which is incorporated herein by reference in its entirety for all purposes.

The techniques described in this disclosure may be implemented in many ways, as one skilled in the art would understand. In one embodiment, the data security system can use the real-time messaging protocol (RTMP) to send real-time meeting data from collaboration platforms to a cloud server (e.g., Apache and NGINX using an RTMP modules). After data has been ingested into the cloud server, the data security system can save it as video chunks, then into frames and audio, and finally send it to the data security system pipeline for processing. In the data security system pipeline, the data security system will apply its AI-based detections to determine if compliance, security, conduct, HR, or privacy risks are present in the real-time content. Risks may include, for example, Social Security Numbers displayed on screen, promissory statements that would fall afoul of Financial Industry Regulatory Authority (FINRA) rules, sharing of ePHI under HIPAA, sharing of data prohibited under privacy regulations like the EU's General Data Protection Regulation or California's CCPA and CPRA, risky behavior, profanity, corporate acceptable use or human resources policies, and others.

In some embodiments, if risks are detected, the data security system will, through a bot or participant present in the meeting, or through a collaboration platform API, take actions in the meeting such as blurring the screen, or removing users from the meeting based on the specific risks that have been detected, for example.

In another embodiment, the data security system can use the webhooks provided by collaboration platforms, which provide information about basic meeting events (e.g., someone shared screen, started meeting, etc.), and use this data to analyze a meeting log. Based on the presence of risky events in the meeting log, the data security system can take appropriate meeting actions such as blurring screens, removing users, etc. From these events we understand who is in the meeting and can decide risk based on the history of the users or detect information barrier violations that are configured by the application.

FIG. 1 is a diagram outlining the functionalities described above with respect to a data security system, collaboration platforms, collaboration platform end users, and data security system administrators. FIG. 1 shows a data security system platform, and outlines examples of processing that may occur in the platform and outlines its interactions with the collaboration platforms. FIG. 1 also shows interactions with participants (end users) of the collaboration platforms and what real-time actions may be taken during use of the platforms.

As shown in the bullet points in FIG. 1, the data security system performs real-time smart snippet content analysis. During the snippet analysis process, the system takes subsets of scenes, frames, audio, chat text, etc. at dynamic or predetermined intervals based on chat, call, and/or video meeting activity events. Snippets may be taken at predetermined intervals, set by default, or configurable by end users. The data security system also performs meeting and session activity analysis where activity events are captured (i.e., a phone call is answered, a chat participant sends a chat message, a participant joins a meeting, a file share initiated, screen sharing initiated, a whiteboard (virtual or real) is shared, etc.). In other words, the data security system is monitoring what is happening in a meeting. The data security system also performs real-time integration platform setting analysis (described in detail below), where the data security system examines settings of a collaboration platform holistically and for each communication or meeting (monitored settings may include meeting passwords, ability to delete meeting chat messages, group joining restrictions, user ID and authentication requirements, etc.).

The data security system also performs content, activity, and setting correlation, where the data security system looks at all these three areas and correlates status combinations (e.g., does the frame/scene show a whiteboard, did a screen-share initiate, and are there unauthenticated users in the chat or video). Other examples are also possible, as described in more detail above. Dynamic parameter scope assessment assesses policy settings and risk settings for each parameter (content, activity, and setting) individually and in combination. As illustrated in FIG. 1, the data security system also addresses un-correlated and correlated policies, as well as policy settings, notifications, and policy actions (described above). Real-time policies can be set on an individual parameter and/or on combination of parameters. Exemplary real-time policies may include:

single parameters such as enforcing user authentication, no deletion of messages, application or file shares archived, voice snippets with phrases such as "this is confidential" flagged, video snippets with physical or digital whiteboards present flagged; etc.

combined parameters such as meeting with an unauthenticated user, where a voice snippet says "confidential", and a physical whiteboard detected in a snippet is flagged.

As discussed above, the data security system can use combinations of different types of data, or "conditions," applied to rules to trigger actions or notifications for users and/or administrators of the platforms. Following are several examples of combinations of conditions that could be used to trigger an alert or action. Many other combinations of conditions are also possible.

the data security system identifies an unauthenticated user in a collaboration meeting and identifies a 'risky text' in the chat in the meeting then the data security system removes that user from the meeting the data security system identifies a missing password setting in a collaboration meeting and identifies an information barrier violation for meeting participants and identifies a 'risky statement' in audio of the meeting then the data security system notifies an administrator about the issue the data security system identifies a missing encryption setting and identifies a 3rd party participant in a meeting and application sharing turned on in collaboration platform then the data security system updates the security setting of the meeting to prohibit application sharing the data security system identifies screen sharing turned on and a schematic shared onscreen and recording by participant turned on then the data security system alerts the participant sharing the schematic that they should not share sensitive information As shown in FIG. 1, the data security system also interacts with the collaboration platforms regarding data security system dynamic integrations. Data security system dynamic integrations include communication content, platform activity, platform integration data, as well as data security system policy action features. The data security system also interacts with the collaboration platforms to take policy actions including changing platform settings, changing communication in real-time, interacting with end-user, etc. Exemplary real-time policy actions may include:

Notify/Alert security system platform administrator and allow administrator to click to initiate remediation actions.

Change setting(s) directly on platform.

Automatically take real-time action in communication session (e.g., stop file transfer in chat, end audio call, turn on recording for audio call, remove participant from meeting, terminate screen-share, etc.).

Automatically engage with end-user participant(s) in communication sessions by taking actions using the real-time notification and interaction features such as inserting an audio disclaimer in an audio call, posting a warning message in a chat, prompting the users to share a disclaimer in video meeting, prompting the user to share approved applications (with a list of approved applications noted) only when the user selects to share an application onscreen.

Trigger reports and/or workflow and/or archive record notations for security system platform users based on policy detections and end-user real-time interactions including noting in an archive record that the end-user selected to display the correct disclaimer resulting in a lowered risk score for the archived recording.

FIG. 1 also illustrates interactions from the perspective of end users of the collaboration platforms. End users may experience policy actions that are manifested in/on their collaboration communication session (e.g., a blocked user, recorded sessions, end of communication, etc.). End users may also experience policy-actions invoked in real-time, such as end-user interaction/coaching (e.g., the presentation of training links, disclaimers, warnings, etc.). Other examples are also possible, as one skilled in the art would understand.

FIG. 1 also illustrates interactions from the perspective of administrative users of the data security system platform. System administrators may initiate event notifications and review alerts. System administrators may also initiate reactive administrative actions or configure and enable parameters for automated policy notifications. System administrators may also conduct reporting and logging reviews.

Figure 2:
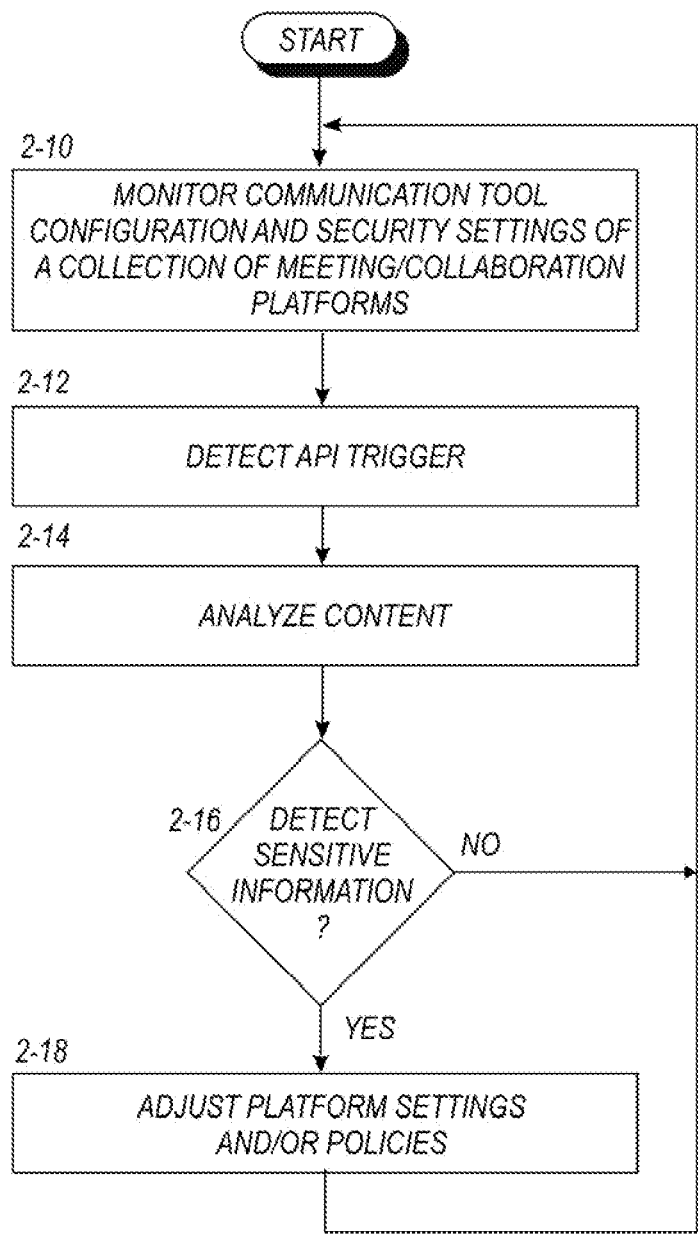
FIG. 2 is a flowchart depicting one example of a process flow occurring in real-time for monitoring and enforcing collaboration settings across a collection of collaboration platforms.
Figure 3:
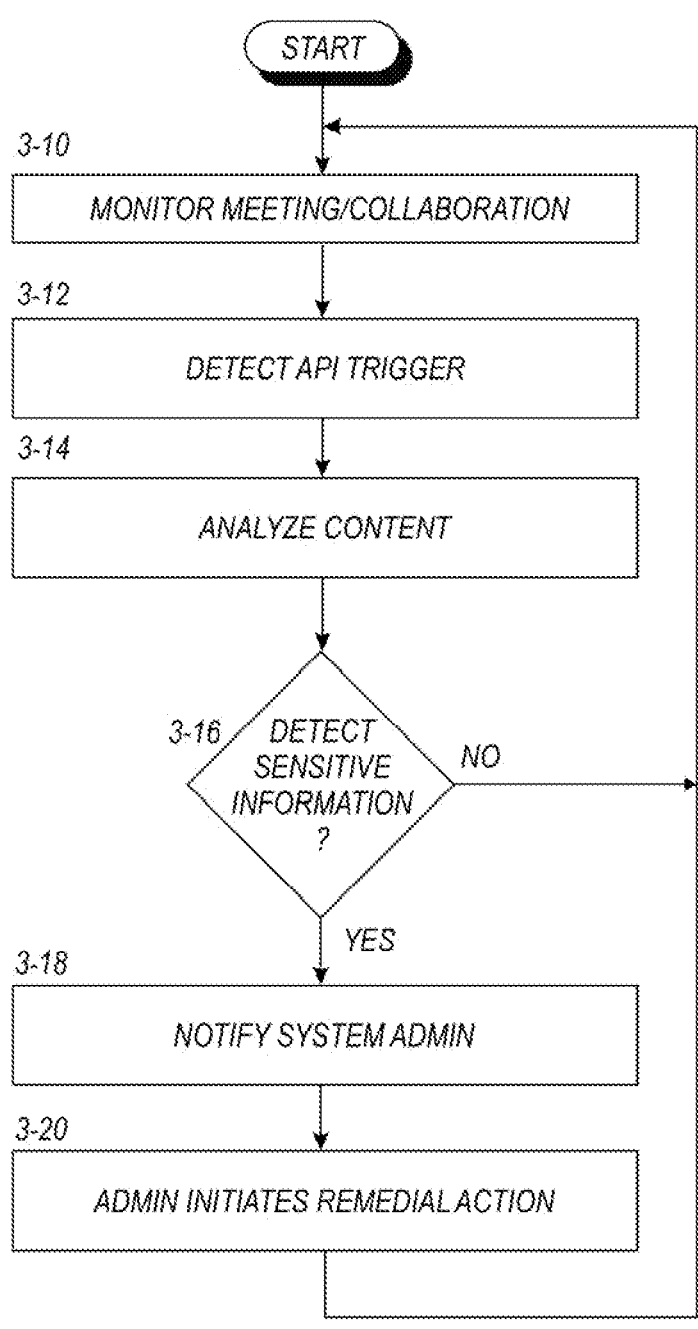
FIG. 3 is a flowchart depicting one example of a process flow occurring in real-time for interactions with a system administrator during a collaboration session conducted over a collaboration platform.
Figure 4:
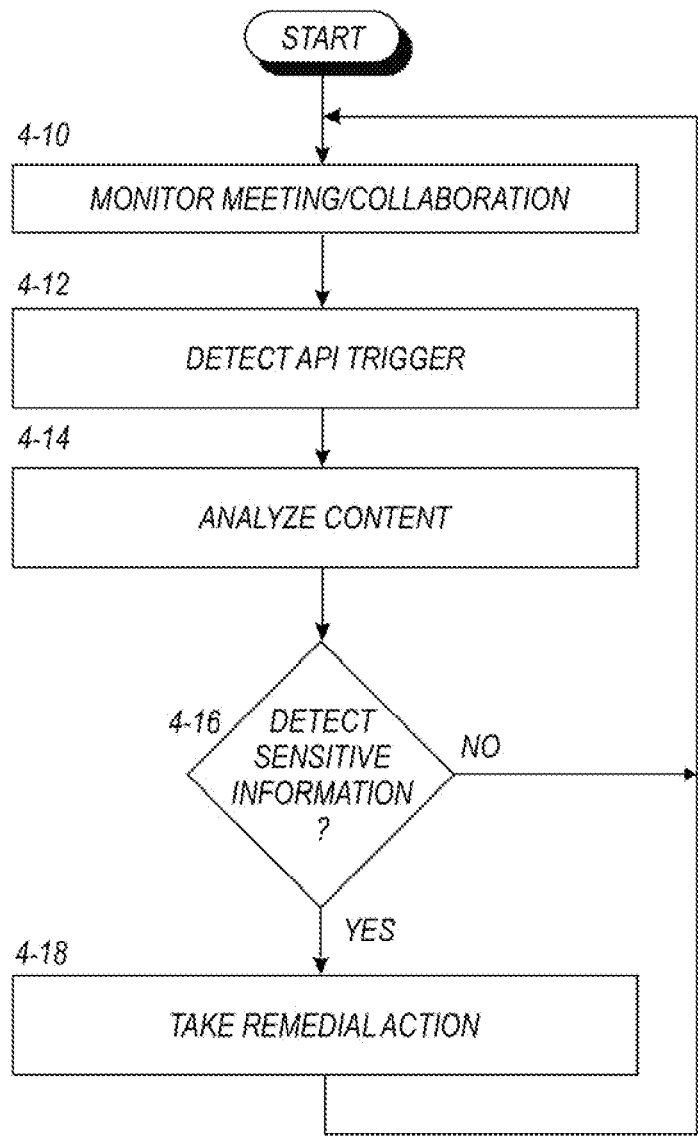
FIG. 4 is a flowchart depicting one example of a process flow occurring in real-time for interactions with an end user during a collaboration session conducted over a collaboration platform.

As described above, in some embodiments, a data security system uses API connections to collaboration platforms to analyze elements of conversations with its artificial intelligence (AI)-enabled detections to identify regulatory, security, and privacy risks and take corresponding actions to limit and remediate risks in real-time. FIGS. 2-4 are flow charts illustrating examples of process flows occurring among a data security system, collaboration platforms, end users of the collaboration platforms, and system administrators. Other exemplary process flows are also possible, as one skilled in the art would understand.

FIG. 2 is a flow chart illustrating one example of a process flow occurring between a data security system and a collection of collaboration platforms. In this example, at step 2-10, the data security system monitors communication tool configuration and security settings of the collection of meeting/collaboration platforms. During an active meeting, an API may trigger a notification to the data security system. The trigger may be based on any number of conditions, for example, that a screen share capability is being used by a participant. As described above, numerous other conditions, or combinations of conditions can result in a trigger. In this example, when a screen share API trigger is detected (step 2-12), the data security system can analyze (e.g., by applying machine learning-based detection or other techniques) (step 2-14) the screen shared content (or other condition(s) that was the cause of the trigger) to determine if it includes information or content that would pose a risk (step 2-16), such as the presence of a sensitive application or sensitive personally identifiable information (PII) like a Social Security Number or birthdate. If sensitive information is not detected, the system continues monitoring the active meeting over the collaboration platform (step 2-10). If sensitive information is detected, the data security system can take automatic, appropriate remedial actions (step 2-18) such as adjusting platform settings and/or policies of the respective collaboration platform. Other remedial actions are also possible, as one skilled in the art would understand.

FIG. 3 is a flow chart illustrating one example of a process flow occurring between a data security system and system administrators in real-time during a session conducted over a collaboration platform. In this example, at step 3-10, an active meeting over a collaboration platform is monitored. During the active meeting, an API may trigger a notification to the data security system. The trigger may be based on any number of conditions, for example, that a screen share capability is being used by a participant. As described above, numerous other conditions, or combinations of conditions can result in a trigger. When the screen share API trigger is detected (step 3-12), the data security system can (e.g., by applying machine learning-based detection or other techniques) (step 3-14) the screen shared content (or other condition(s) that was the cause of the trigger) to determine if it includes information or content that would pose a risk (step 3-16), such as the presence of a sensitive application or sensitive personally identifiable information (PII) like a Social Security Number or birthdate. If sensitive information is not detected, the system continues monitoring the active meeting over a collaboration platform (step 3-10). If sensitive information is detected, the data security system can take automatic, appropriate remedial actions such as notifying a system administrator (step 3-18). The system administrator(s) can review notifications and alerts and can initiate appropriate remedial actions (step 3-20) such as initiating reactive administrative actions or configuring and enabling parameters for automated policy notifications. System administrators may also conduct reporting and logging reviews. Other remedial actions are also possible, as one skilled in the art would understand.

FIG. 4 is a flow chart illustrating one example of a process flow occurring in real-time during a session conducted over a collaboration platform. In this example, at step 4-10, an active meeting over a collaboration platform is monitored. During the active meeting, an API may trigger a notification to the data security system. The trigger may be based on any number of conditions, for example, that a screen share capability is being used by a participant. As described above, numerous other conditions, or combinations of conditions can result in a trigger. When the screen share API trigger is detected (step 4-12), the data security system can to analyze (e.g., by applying machine learning-based detection or other techniques) (step 4-14) the screen shared content (or other condition(s) that was the cause of the trigger) to determine if it includes information or content that would pose a risk (step 4-16), such as the presence of a sensitive application or sensitive personally identifiable information (PII) like a Social Security Number or birthdate. If sensitive information is not detected, the system continues monitoring the active meeting over a collaboration platform (step 4-10). If sensitive information is detected, the data security system can take automatic, appropriate remedial actions (step 4-18) such as manifesting a simultaneous pop-up notification to the user to exercise caution when sharing or removing the user that is sharing the sensitive information from the meeting. Other remedial actions are also possible, as one skilled in the art would understand.

Figure 5:
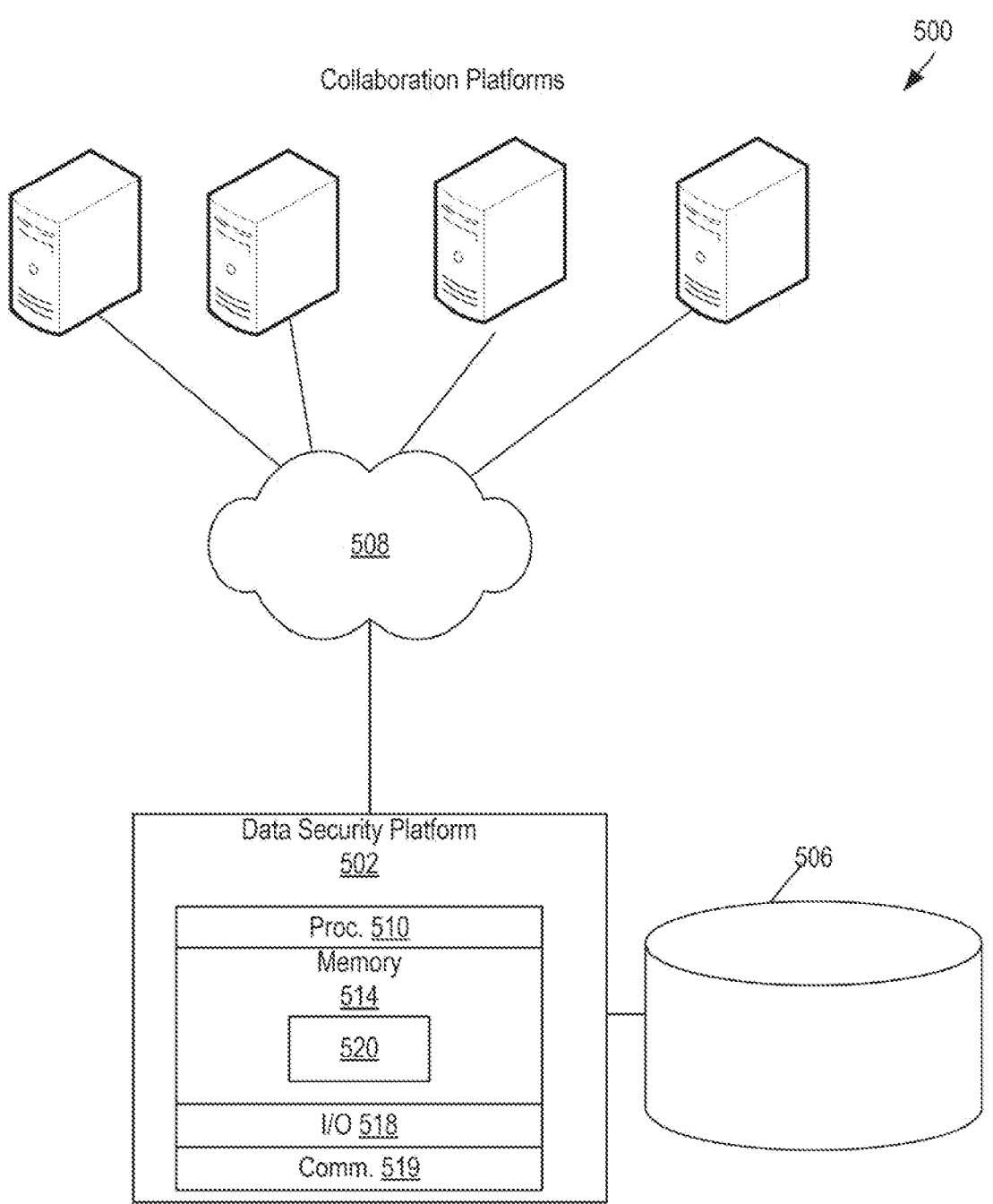
FIG. 5 is a diagrammatic representation of one embodiment of a network environment.

FIG. 5 is a diagrammatic representation of one embodiment of a system for monitoring and enforcing security controls across heterogeneous collaboration platforms. The system for system for monitoring and enforcing collaboration platform controls across heterogeneous collaboration platforms may comprise one or more computer systems with central processing units executing instructions embodied on one or more computer-readable media where the instructions are configured to perform at least some of the functionality associated with embodiments of the present invention. In the illustrated embodiment, system 500 includes a computer system 502 having a computer processor 510 and associated memory 514. Computer processor 510 may be an integrated circuit for processing instructions. For example, computer processor 510 may comprise one or more cores or micro-cores of a processor. Memory 514 may include volatile memory, non-volatile memory, semi-volatile memory or a combination thereof. Memory 514, for example, may include RAM, ROM, flash memory, a hard disk drive, a solid-state drive, an optical storage medium (e.g., CD-ROM), or other computer-readable memory or combination thereof. Memory 514 may implement a storage hierarchy that includes cache memory, primary memory or secondary memory. In some embodiments, memory 514 may include storage space on a data storage array. Computer system 502 may also include input/output ("I/O") devices 518, such as a keyboard, monitor, printer, electronic pointing device (e.g., mouse, trackball, stylus, etc.), or the like. Computer system 502 may also include a communication interface 519, such as a network interface card, to interface with network 508, which may be a local LAN, a WAN such as the Internet, mobile network, or other type of network or combination thereof. Network 508 may represent a combination of wired and wireless networks that may be utilized for various types of network communications.

Memory 514 may store instructions executable by computer processor 510. For example, memory 514 may include code executable to provide an interface, such as an API or other interface to interface with heterogeneous online collaboration systems. According to one embodiment, memory 514 may include code 520 executable to provide a data security platform, such as data security platform 502. Data store 506, which may be part of or separate from memory 514, may comprise one or more database systems, file store systems, or other systems to store various data used by computer system 502.

Each of the computers in FIG. 5 may have more than one CPU, ROM, RAM, HD, I/O, or other hardware components. Portions of the methods described herein may be implemented in suitable software code that may reside within memory 514 or other computer-readable memory.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways to implement the invention.

It is also within the spirit and scope of the invention to implement in software programming or code the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only, but not by limitation, an electronic, magnetic, optical, electromagnetic, infrared, or semiconductor system, apparatus, system, device, propagation medium, or computer memory. Such a computer-readable medium shall generally be machine readable and include software programming or code that can be human readable (e.g., source code) or machine readable (e.g., object code). Examples of nontransitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

What is claimed is:

1. A data security system comprising:
a memory;
a processor; and
a non-transitory, computer-readable storage medium storing a set of instructions executable by the processor, the set of instructions comprising instructions for:
interfacing with a plurality of heterogeneous online collaboration platforms;
monitoring an active meeting conducted over a first collaboration platform of the collaboration platforms, the active meeting involving a plurality of users of the first collaboration platform communicating with each other in a collaboration session over the first collaboration platform, the monitoring including monitoring communications and monitoring collaboration platform settings;
detecting, during the active meeting, an occurrence of one or more conditions from the monitoring of the active meeting, the one or more conditions relating to a combination of characteristics of the active meeting, the characteristics comprising of at least one of visual communication content, textual/audio communication content, participant activity events, and collaboration platform settings;
analyzing the detected occurrence of the one or more conditions to identify a security risk related to sensitive data within the communications;
determining, based on the analysis, that the occurrence of the one or more conditions poses the security risk; and
based on a determining that the occurrence of the one or more conditions poses the security risk, taking one or more remedial actions, wherein the one or more remedial actions includes sending a notification to a user or system administrator.

2. The data security system of claim 1, wherein detecting one or more conditions further comprises detecting the occurrence of first and second conditions of the active meeting.

3. The data security system of claim 2, wherein detecting one or more conditions further comprises detecting the occurrence of the first, the second, and a third condition of the active meeting.

4. The data security system of claim 1, wherein the one or more remedial actions includes adjusting settings or policies of the first collaboration platform.

5. The data security system of claim 1, wherein the one or more remedial actions further comprises removing a user from the active meeting.

6. The data security system of claim 5, wherein the one or more remedial actions includes the system administrator initiating reactive remedial actions.

7. The data security system of claim 1, wherein the one or more remedial actions includes notifying a user of the first collaboration platform.

8. A data security method comprising:
interfacing with a plurality of heterogeneous online collaboration platforms;
monitoring an active meeting conducted over a first collaboration platform of the collaboration platforms, the active meeting involving a plurality of users of the first collaboration platform communicating with each other in a collaboration session over the first collaboration platform, the monitoring including monitoring communications and monitoring collaboration platform settings;
detecting, during the active meeting, an occurrence of one or more conditions from the monitoring of the active meeting, the one or more conditions relating to a combination of characteristics of the active meeting, the characteristics comprising of at least one of visual communication content, textual/audio communication content, participant activity events, and collaboration platform settings;
analyzing the detected occurrence of the one or more conditions to identify a security risk related to sensitive data within the communications;
determining, based on the analysis, that the occurrence of the one or more conditions poses the security risk; and
based on a determining that the occurrence of the one or more conditions poses the security risk, taking one or more remedial actions, wherein the one or more remedial actions includes sending a notification to a user or system administrator.

9. The method of claim 8, wherein detecting one or more conditions further comprises detecting the occurrence of first and second conditions of the active meeting.

10. The method of claim 9, wherein detecting one or more conditions further comprises detecting the occurrence of the first, the second, and a third condition of the active meeting.

11. The method of claim 8, wherein the one or more remedial actions includes adjusting settings or policies of the first collaboration platform.

12. The method of claim 8, wherein the one or more remedial actions further comprises removing a user from the active meeting.

13. The method of claim 12, wherein the one or more remedial actions includes the system administrator initiating remedial actions.

14. The method of claim 8, wherein the one or more remedial actions includes notifying a user of the collaboration platform.

15. A data security system comprising:

a memory;

a processor; and a non-transitory, computer-readable storage medium storing a set of instructions executable by the processor, the set of instructions comprising instructions for:

interfacing with a plurality of heterogeneous online collaboration platforms;

monitoring an active meeting conducted over a first collaboration platform of the collaboration platforms, the active meeting involving a plurality of users of the first collaboration platform communicating with each other in a collaboration session over the first collaboration platform, the monitoring including monitoring communications and monitoring collaboration platform settings;

detecting, during the active meeting, an occurrence of one or more conditions from the monitoring of the active meeting, the one or more conditions relating to a combination of characteristics of the active meeting, the characteristics comprising of at least one of visual communication content, textual/audio communication content, participant activity events, and collaboration platform settings;

analyzing the detected occurrence of the one or more conditions to identify a security risk related to sensitive data within the communications;

determining, based on the analysis, that the occurrence of the one or more conditions poses the security risk; and based on a determining that the occurrence of the one or more conditions poses the security risk, taking one or more remedial actions, wherein the one or more remedial actions includes sending a notification to a user or system administrator.

16. The data security system of claim 15, wherein detecting one or more conditions further comprises detecting a first condition from a transcript of the meeting and a second condition relating to a user authentication.

17. The data security system of claim 15, wherein detecting one or more conditions further comprises detecting a first condition relating to application sharing by a participant of the meeting and a second condition relating to an encryption setting.

18. The data security system of claim 15, wherein detecting one or more conditions further comprises detecting a first condition relating to application sharing by a participant of the meeting and a second condition relating to an initiation of recording of the meeting.

19. The data security system of claim 15, wherein detecting one or more conditions further comprises detecting a first condition relating to screen sharing by a participant of the meeting and a second condition relating to an initiation of recording of the meeting.

20. The data security system of claim 1, wherein the risk is related to content of the monitored communications.

* * * * *